United States Patent [19]

Musschoot

[11] 3,743,080

[45] July 3, 1973

[54] SOUND DEADENER FOR VIBRATORY CONVEYOR

[75] Inventor: Albert Musschoot, Barrington, Ill.

[73] Assignee: General Kinematics Corporation, Barrington, Ill.

[22] Filed: July 6, 1971

[21] Appl. No.: 159,807

[52] U.S. Cl. .......................................... 198/220 BA
[51] Int. Cl. ............................................ B65g 27/00
[58] Field of Search ................ 198/220 BA, 220 CB

[56] References Cited
UNITED STATES PATENTS

| 2,795,318 | 6/1957 | Morris | 198/220 BA |
| 2,157,339 | 5/1939 | Jeffery | 198/220 BA |

FOREIGN PATENTS OR APPLICATIONS

| 1,087,519 | 8/1960 | Germany | 198/220 BA |

*Primary Examiner*—Richard E. Aegerter
*Attorney*—Axel A. Hofgren, Ernest A. Wegner et al.

[57] ABSTRACT

A vibratory conveyor including structure for deadening sound incurred during operation thereof by reason of the contact of a conveying surface with articles being conveyed. A chamber is provided underneath the conveying surface and in abutment therewith and the chamber is substantially sealed. An inlet near the input end of the conveying surface is provided to the chamber to permit entry of particles thereinto with the result that the vibrating mechanism for the vibratory conveyor will compact the particles against the underside of the conveying surface to preclude the same from vibrating at a frequency within the audible range. A method for practicing the invention is also specified.

6 Claims, 4 Drawing Figures

PATENTED JUL 3 1973 3,743,080

Inventor:-
Albert Musschoot,
By Hofgren, Wegner, Allen, Stellman & McCord
Attys.

SOUND DEADENER FOR VIBRATORY CONVEYOR

BACKGROUND OF THE INVENTION

This invention relates to vibratory conveyors, and more specifically, to deadening the sound often incurred in the operation of such conveyors.

Increasingly, vibratory conveyors are being employed in operations wherein heavy articles are conveyed by a vibrating conveying surface. The very nature of such conveyors results in intermittent contact between the surface and the article being conveyed and when the latter is of substantial size or of a particular material such as metal, the intermittent contact results in the generation of substantial noise. A typical operation is the conveying and/or shaking out of castings in a forge or foundry operation. In such cases, not only are the aricles being conveyed formed of metal, but in order to withstand the wear attendant such operations, the conveying surface itself must be formed of metal and the resultant metal-to-metal contact during operation of the conveyor is capable of generating substantial sound if means are not provided for reducing the magnitude of the same. When no such provision is made, a very poor working environment results.

SUMMARY OF THE INVENTION

It is the principal object of the invention to provide a new and improved vibratory conveyor wherein a conveying surface is substantially precluded from vibrating at a frequency within the audible range to minimize or eliminate the noise attendant heavy conveying operations, such as casting conveying or shake-out operations.

An exemplary embodiment of the invention achieves the foregoing object by means of a vibratory conveyor having an input end adapted to receive heavy articles having particles associated therewith and for conveying them along the surface to an output end. A chamber is provided below the conveying surface with the lower side of the conveying surface defining the upper side of the chamber and the chamber is substantially sealed except for passages through the conveying surface near the input end thereof.

As a result, particles associated with the articles to be conveyed are shaken loose as they impinge upon the conveying surface and a portion of the same may pass through such passages into the chamber to be received therein and compacted against the undersurface of the conveying surface by operation of a vibrating mechanism for vibrating the conveying surface.

The compacting of such particles against the conveying surface substantially precludes the same from ringing at a frequency within the audible range thereby reducing the article conveying surface contact noises at least to dull thuds from a typical ringing or clanking noise.

The invention also contemplates a novel method for sound deadening a vibratory conveying surface including the steps of intercepting particles associated with articles to be conveyed as they are placed upon the conveyor and compacting the same against the conveying surface for sound deadening purposes.

Other objects and advantages will become apparent from the following specification taken in conjunction with the accompanying drawings.

DESCRIPTION OF THE PREFERRED EMBODIMENT

Figure 1:
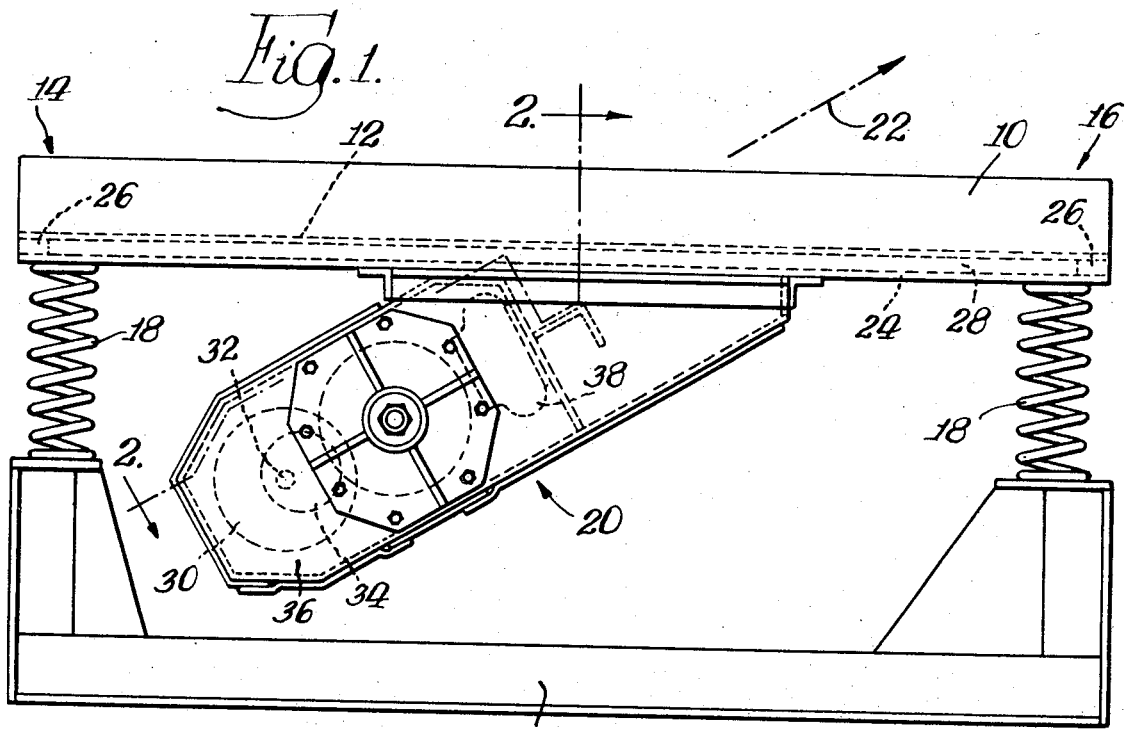
FIG. 1 is a side elevation of a vibratory conveyor embodying the invention.
Figures 2, 3:
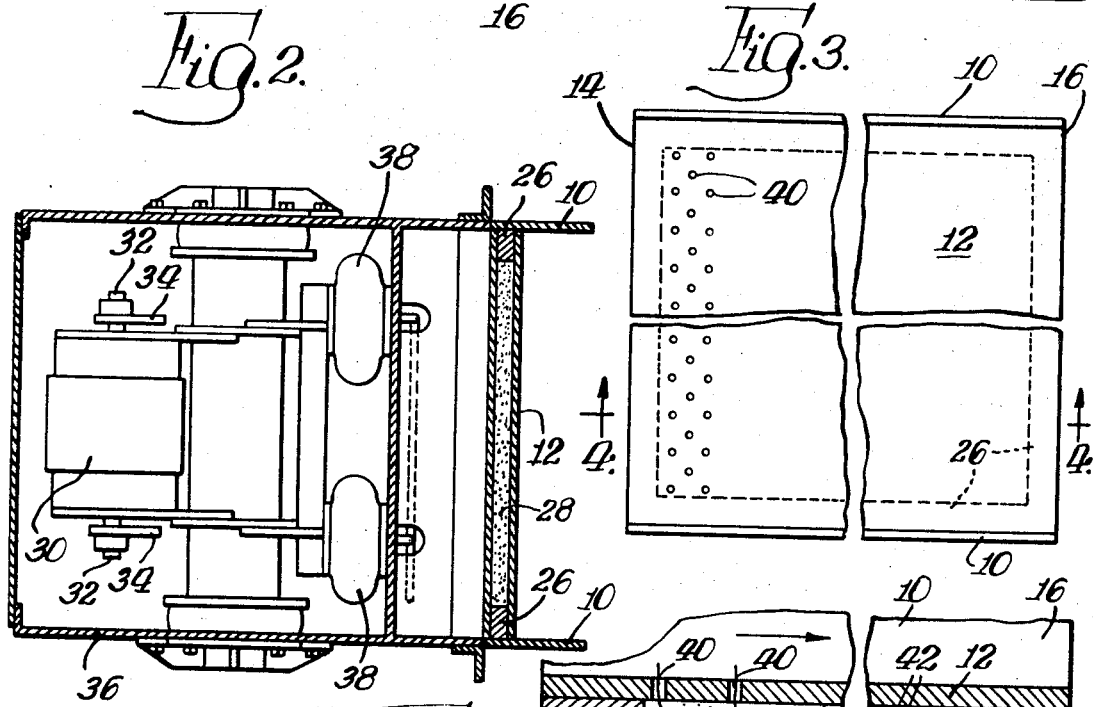
FIG. 2 is a sectional view taken approximately along the line 2—2 of FIG. 1.
FIG. 3 is a fragmentary plan view of the conveying surface.
Figure 4:
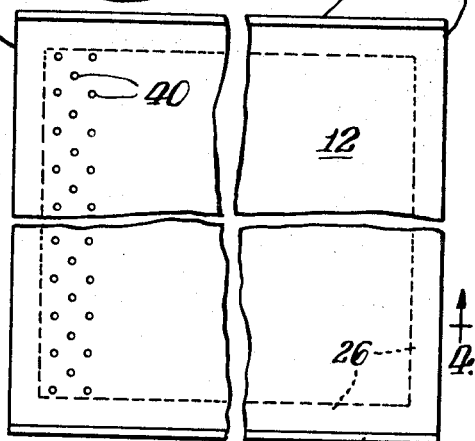
FIG. 4 is a vertical section taken approximately along the line 4—4 of FIG. 3.

An exemplary embodiment of a vibratory conveyor made according to the invention is illustrated in the drawings and with specific reference to FIGS. 1 and 2, is seen to include a trough-like conveying surface comprised of upstanding side walls 10 and a conveying plate 12. As illustrated in FIG. 1, the conveying plate 12 is adapted to receive articles to be conveyed at its left-hand or input end 14 and convey them to an output end 16. The conveying surface is resiliently mounted on a base 16 by means of springs 18 to permit the same to vibrate relative thereto and a vibrating mechanism, generally designated 20, is secured to the underside of the conveying surface to impart vibratory motion in a direction of the arrow 22 so as to convey articles from the input end 14 to the output end 16.

Spaced below the conveying plate 12 is a chamber defining plate 24. Spacing pieces 26 interposed between the plates 12 and 24 about the entire periphery of both define, along with plates 12 and 24, a chamber 28.

In actuality, the vibrating mechanism 20 is secured to the underside of the plate 24 and includes a motor 30 having oppositely and outwardly extending rotary output shaft ends 32 eccentrically mounting weights 34. The same is contained in a housing 36 and in conjunction with air pressurized rubber donuts 38, imparts oscillatory motion to the conveyor in a conventional manner.

The chamber 28 is filled with a particulate material 42 such as sand so that the vibratory motion applied to the conveyor will tend to compact the sand against the underside of the conveying plate 12 to preclude the same from vibrating substantially at a frequency in the audible range.

Since the conveying action will operate on the sand as well as the articles being conveyed and tend to compact the same to a greater degree at the exit end, the preferred embodiment includes a plurality of passages in the form of apertures 40 extending through the conveying plate 12 adjacent to the input plate 14 thereof into the chamber 28. Thus, particles associated with the articles to be conveyed may pass through the passages 40 into the chamber 28 so that the entire chamber 28 will be filled with sand and compacted against the underside of the conveying plate 12. However, for conveying uses where the articles may not have particulate matter associated with them, the chamber 28 may be completely sealed after being preloaded with particulate material.

In either event, the compacting of the particles 42 against the underside of the conveying plate 12 precludes the same from "ringing" upon contact of the plate 12 with the articles being conveyed during operation of the conveyor so as to minimize the noise attendant the operation. It will be appreciated that in such an operation, the plate 12 will normally be formed of a metal and, of course, the castings being conveyed will be metallic as well. But the presence of the particles 42 compacted against the underside of the plate 12 preclude the generation of substantial noise even with the resultant metal-to-metal contact attendant such conveying.

I claim:

1. In a vibratory conveyor, the combination comprising: a conveying surface adapted to convey articles when vibrated, said surface being formed of material that will generate sound when contacting articles being conveyed and having an input end and an output end; a vibrating mechanism for vibrating said surface to cause articles to be conveyed therealong; sound deadening means for said surface comprising means defining a chamber under said surface and in abutment therewith and particle passage means adjacent the input end of said surface defining at least one opening of sufficient size to permit particles on said surface to enter said chamber to be compacted therein and against said surface to preclude the same from vibrating at a frequency in the audible range; and means for retaining a compacted body of particles within said chamber and against said surface.

2. A vibratory conveyor comprising a metal conveying plate having an input end adapted to receive articles to be conveyed, and an output end; a vibrating mechanism for vibrating said plate so that articles received at said input end will be conveyed therealong to said output end; and sound deadening means for precluding said metal plate from vibrating substantially in the audible range due to contact of the same with articles being conveyed thereby including means defining, in conjunction with the underside of said plate, a substantially closed chamber, at least one particle passage extending through said plate near said input end into said chamber of sufficient size to allow particles received on said plate to pass through said passage into said chamber to be compacted therein against each other and against said plate by said vibrating mechanism to preclude the plate from vibrating at a frequency in the audible range; and means for retaining a sufficient number of particles in said chamber so that the particles will be compacted against said plate.

3. The vibratory conveyor of claim 2 wherein said particle passage comprises a plurality of apertures extending through said plate and said chamber is defined by a second plate spaced below said first plate, said chamber being sealed except for said passages to define said retaining means.

4. A method of sound deadening a metallic vibratory conveyor surface employed in the conveying of heavy articles having small particles associated therewith comprising: removing at least a portion of the particles as the articles are placed on the conveying surface and compacting them against the underside of the conveying surface to preclude the latter from vibrating in the audible range due to contact of the same with the heavy articles.

5. The method of claim 4 wherein said heavy articles are castings and said particles are sand particles.

6. In a vibratory device, the combination comprising: a vibratory surface adapted to perform work on articles when vibrated, said surface being formed of a material that will generate sound when contacting the articles being worked upon; a vibrating mechanism for vibrating said surface to cause work to be performed on articles contacting the same; and sound deadening means for said surface comprising means defining a chamber adjacent said surface and in abutment therewith, and means comprising a compacted body of dividual particles within said chamber to preclude the same from vibrating at a frequency in an audible range.

* * * * *